(12) United States Patent
Kalidindi et al.

(10) Patent No.: US 9,009,760 B2
(45) Date of Patent: Apr. 14, 2015

(54) PROVISIONING INTERACTIVE VIDEO CONTENT FROM A VIDEO ON-DEMAND (VOD) SERVER

(75) Inventors: Srirama Kalidindi, Flower Mound, TX (US); Sanjay Ahuja, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 399 days.

(21) Appl. No.: 13/173,228

(22) Filed: Jun. 30, 2011

(65) Prior Publication Data
US 2013/0007818 A1    Jan. 3, 2013

(51) Int. Cl.
| | |
|---|---|
| G06F 13/00 | (2006.01) |
| H04N 21/432 | (2011.01) |
| H04N 21/472 | (2011.01) |
| H04N 21/4722 | (2011.01) |
| H04N 21/6547 | (2011.01) |

(52) U.S. Cl.
CPC ..... *H04N 21/4325* (2013.01); *H04N 21/47202* (2013.01); *H04N 21/4722* (2013.01); *H04N 21/6547* (2013.01)

(58) Field of Classification Search
USPC ............ 725/37–41, 86–88, 91, 100, 102–103
See application file for complete search history.

(56) References Cited

U.S. PATENT DOCUMENTS

| | | | |
|---|---|---|---|
| 2004/0136698 A1* | 7/2004 | Mock | 386/123 |
| 2005/0188408 A1* | 8/2005 | Wallis et al. | 725/87 |
| 2008/0155617 A1* | 6/2008 | Angiolillo et al. | 725/93 |
| 2009/0183208 A1* | 7/2009 | Christensen et al. | 725/58 |
| 2009/0235317 A1* | 9/2009 | Igarashi | 725/82 |
| 2010/0060802 A1* | 3/2010 | Huegel | 348/734 |

OTHER PUBLICATIONS

Advanced Television Systems Committee, "ATSC Standard: Software Download Data Service", Document A/97, Nov. 16, 2004, 14 pages.

CableLabs®, "OpenCable™ Specifications—Enhanced TV Binary Interchange Format 1.0", OC-SP-ETV-BIF1.0-I03-060714, Jul. 14, 2006, 380 pages.

CableLabs®, "OpenCable™ Specifications—ETV—Enhanced TV Application Messaging Protocol 1.0", OC-SP-ETV-AM1.0-I04-070921, Sep. 21, 2007, 29 pages.

* cited by examiner

*Primary Examiner* — Jun Fei Zhong (57) ABSTRACT

A system may send a request for video content to a server device; obtain, in response to the request, control information, associated with the video content, where the control information may include one or more digital versatile disc (DVD) features that correspond to one or more portions of the video content; and present the control information, for display, via a user interface, where presenting the control information for display may enable a user, of the video client device, to interact with the control information as though the video content was being played by a DVD player. The system may also receive selection of a DVD feature, of the one or more DVD features; and obtain, from the server device, a portion of the video content, of the one or more portions of the video content, that begins at a point that corresponds to the selected DVD feature.

17 Claims, 7 Drawing Sheets

PROVISIONING INTERACTIVE VIDEO CONTENT FROM A VIDEO ON-DEMAND (VOD) SERVER

BACKGROUND

User devices may obtain interactive video content from a digital versatile disc (DVD) and may play the interactive video content on the user devices. The user devices may obtain, from the interactive video content, DVD features that allow users, of the user devices, to use DVD features when the user devices are playing the interactive video content. The user devices may provide the DVD features using the DVD features, which may include displaying a menu, a page, a user interface, etc. that allows the users to select from a number of scenes to be played, to set preferences (e.g., closed captioning, languages, etc.), to control playback (e.g., fast forward, rewind, pause, etc.). When the user devices obtain Video On-Demand (VOD) content, from a network, the VOD content may not include the DVD features and/or may be played, by the user devices, without the DVD features.

DETAILED DESCRIPTION OF PREFERRED EMBODIMENTS

The following detailed description refers to the accompanying drawings. The same reference numbers in different drawings may identify the same or similar elements. Also, the following detailed description does not limit the implementations.

Systems and/or methods, described herein, may allow a video on-demand (VOD) server to provide video content to a video client device in a manner that permits a user, of the video client device, to interact with the video content as though the user was playing the video content from a digital versatile disc (DVD). The video content may include video information (e.g., video signals, data, etc.) and/or audio information (e.g., audio signals, data, etc.).

The systems and/or methods may allow a content server to read metadata, associated with video content, from a memory and/or storage device (e.g., such as a DVD) that stores the video content and/or the metadata. The metadata may describe the video content and/or may include information that specifies a manner in which the video content is stored in the memory and/or storage device. The metadata may, for example, identify segments of the video content (hereinafter referred to as "chapters") that correspond to different scenes, trailers, preferences, etc. associated with the video content, such as movie, a documentary, etc. The metadata may also include images, trailers, ratings, and/or other information associated with the video content.

The systems and/or methods may allow the content server to process the metadata to create interactive DVD features (hereinafter referred to as "DVD features"). The DVD features may include a collection of DVD elements and/or options. The DVD features may allow a user, of the video client device, to chose from a menu of different DVD elements and/or options, that corresponds to different chapters included within the video content, playback controls (e.g., fast forward, rewind, pause, etc.), preference settings (e.g., languages, closed captioning, picture quality, screen size, etc.).

The systems and/or methods may allow the content server to convert the video content, obtained from the DVD, to a format that can be streamed (e.g., to the video client device) by a VOD server. The systems and/or methods may enable the content server to convert the DVD features into a format that can be streamed, by the VOD server, to the video client. Streaming the DVD features to the video client may permit the user to interact with the DVD features to obtain all or a portion (e.g., one or more chapters) of the video content from the VOD server. The user may interact with the DVD features as though the user was receiving video content being played by a DVD player and/or drive.

The systems and/or methods may allow the content server to convert the DVD features into an interactive DVD script and/or application (hereinafter referred to as "DVD application") to be transmitted, by an application server, to the video client device. The video client device may execute the DVD application to cause the DVD features to be rendered, for display and via a user interface, on a display device associated with the video client. Rendering the DVD features for display may permit the user to interact with the DVD features to obtain all or a portion of the video content as though the user was receiving video content being played by a DVD player and/or drive.

Figure 1:
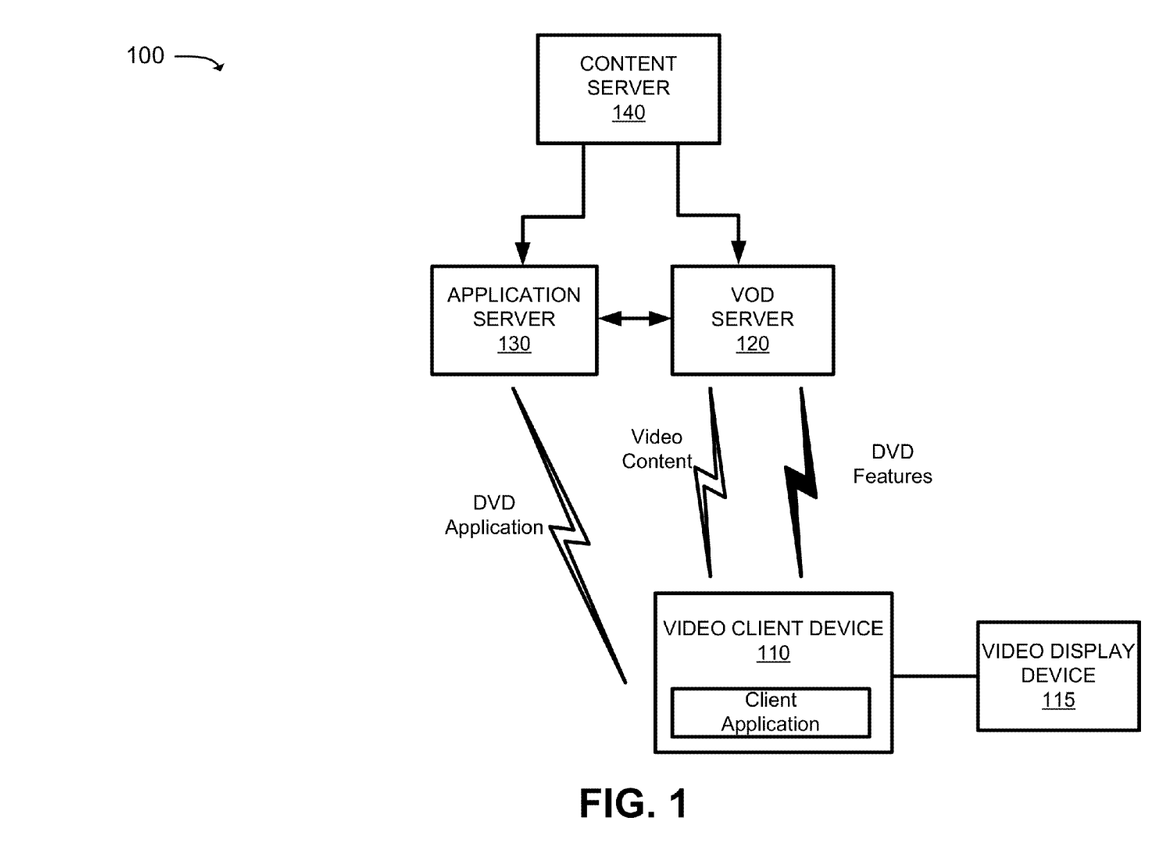
FIG. 1 is a diagram of an example environment in which systems and/or methods described herein may be implemented.

FIG. 1 is a diagram of an example environment 100 in which systems and/or methods described herein may be implemented. As shown in FIG. 1, environment 100 may include a video client device 110 (hereinafter referred to as "video client 110"), video display device 115 (hereinafter referred to as "video display 115"), a video on-demand (VOD) server 120, an application server 130, and a content server 140. The number of devices, illustrated in FIG. 1, is provided for explanatory purposes only. In practice, there may be additional devices, fewer devices, different devices, or differently arranged devices than illustrated in FIG. 1.

Also, in some implementations, one or more of the devices of environment 100 may perform one or more functions described as being performed by another one or more of the devices of environment 100. For example, application server 130 and content server 140 may be combined into a single device. Devices of environment 100 may interconnect via wired connections, wireless connections, or a combination of wired and wireless connections.

Video client 110 may include a device that can communicate with VOD server 120 to receive and/or process video content or interactive video content. In one example implementation, video client 110 may take the form of a set-top box (STB). In another implementation, video client 110 may include a cable card, a communication device (e.g., a telephone, such as a voice over Internet protocol (VoIP) telephone or a mobile telephone), or the like.

In yet another example implementation, video client 110 may take the form of a computer device (e.g., a desktop computer, a laptop computer, a tablet computer, etc.). In still another example, video client 110 may take the form of a wireless handheld device (e.g., smart phone, a personal digital assistant (PDA), etc.).

Video client 110 may host a client application that performs operations that enables a user of video client 110 to interact with DVD features and/or video content. The client application may enable video client 110 to communicate with application server 130 to obtain a DVD application and/or script, to be described in greater detail below, that enables a user of video client 110 to interact with DVD features associated with video content received from VOD server 120.

Video client 110 may receive video content from VOD server 120. Video client 110 may process the video content by decoding and/or decrypting the video content, using a compression/decompression (CODEC) application stored on video client 110. Video client 110 may present the video content, for display, on a video device associated with video client 110.

Video client 110 may receive DVD features, associated with video content, from VOD server 120. The DVD features may include signaling information (e.g. triggers) that enables a client application, hosted by video client 110, to detect a presence of the DVD features associated with the video content. In one example, the DVD features may be based on an Enhanced Television (ETV) binary information format (EBIF) standard and/or some other standard or protocol. The client application may detect the DVD features and may present, for display on video display 115, the DVD features to provide a user interface via which a user, of video client 110, may obtain all or a portion of the video content from VOD server 120.

In another example, video client 110 may receive, from application server 130, a DVD application associated with video content stored in VOD server 120. The DVD application may be based on a script language and/or protocol that is not based on the EBIF standard. The script language may, in one example, be an extension language such as Lua (pronounced "loo-ah"), which is used in high-end applications (e.g., dynamic three-dimensional (3D) video and animation, gaming applications, etc.). The protocol may, in another example, be associated with a binary protocol that can be executed by the client application hosted by video client 110. Video client 110 may cause the DVD application to execute, which may cause the DVD application to present, for display, on video display 115, the DVD features to be used by the user to obtain all or a portion of the video content.

Video display 115 may include one or more devices capable of receiving, processing and/or displaying video and/or audio signals, associated with video content, received from video client 110. In one example implementation, video display 115 may take the form of a television. In another implementation, video display 115 may include a computer monitor, a display of a communication device (e.g., a telephone, such as a VoIP telephone or a mobile telephone, or a PDA), or the like.

VOD server 120 may include one or more server devices, or other types of computation or communication devices, that gather, process, search, store, and/or provide information in a manner similar to that described herein. VOD server 120 may, for example, perform operations to receive, store, process, and/or distribute video content or interactive video content to video client 110.

VOD server 120 may receive, from content server 140, video content and/or DVD features, associated with the video content and may store the video content and/or the DVD features in a memory associated with VOD server 120. In one example, VOD server 120 may transmit the DVD features to video client 110 in response to a request. The DVD features may permit a user, of video client 110, to interact with the DVD features and/or to request a portion of the video content. VOD server 120 may receive the request and may transmit the portion of the video content to video client 110. The portion of the video content may correspond to a particular chapter and/or scene that was selected by the user when interacting with the DVD features. VOD server 120 may receive other instructions associated with controlling playback of the video content, such as a fast forward instruction, a rewind instruction, a pause instruction, etc.

Application server 130 may include one or more server devices, or other types of computation or communication devices, that gather, process, search, store, and/or provide information in a manner similar to that described herein. Application server 130 may communicate with video client 110, VOD server 120 and/or content server 140. Application server 130 may transmit an interactive media guide (IMG) to video client 110. The interactive media guide may include information associated with video content (e.g., such as a list of video content) that is stored by VOD server 120. Application server 130 may transmit the IMG to video client 110 and/or permit video client 110 to access the IMG. The IMG may allows a user, of video client 110, to select, via the IMG, video content to be downloaded to video client 110. In one example, the IMG may list all of the video content that is stored by VOD server 120. A portion of the list of video content may include an indication associated with video content that includes DVD features.

Application server 130 may receive DVD features and/or a DVD application from content server 140 and may store the DVD features and/or the DVD application in a memory associated with application server 130. Application server 130 may receive, via the IMG and from video client 110, a request for video content and may instruct, in response to the request, VOD server 120 to transmit the video content to video client 110. Application server 130 may, in another example, retrieve a DVD application, associated with the video content, and may transmit the DVD application to video client 110.

Content server 140 may include one or more devices, or other types of computation or communication devices, that gather, process, search, store, and/or provide information in a manner similar to that described herein. In one example implementation, content provider 140 may perform operations to generate DVD features based on metadata, associated with video content, obtained from a memory and/or storage device (e.g., such as a DVD or some other storage device). Content server 140 may, for example, process the metadata to create the DVD features. For example, content server 140 may examine the metadata to identify chapters and/or scenes associated with the various portions of the video content. The identified chapters and/or scenes may include identifiers (e.g., such as titles, images, etc.), pointers (e.g., identifying a starting point associated with the chapter or scene), etc. Content server 140 may identify information associated with screen size (e.g., aspect ratio) and/or resolution level (e.g., high definition, standard definition, etc.) and/or other information (e.g., closed captioning, audio in different languages, etc.).

Content server 140 may, in one example, generate the DVD features in a format that conforms to an EBIF standard or some other standard that enables the DVD features to be streamed to video client 110. Content server 140 may also, or alternatively, generate control signaling (e.g., triggers), to be included in the DVD features, that permit a client application, hosted by video client 110, to detect DVD features being streamed from VOD server 120. In another example, content server 140 may parse the video content into one or more portions in a manner that corresponds to the starting points of the scenes and/or chapters.

Content server 140 may obtain video content from the storage device and may convert the video content into a format that can be streamed, by VOD server 120 (e.g., as a video stream, etc.), to video client 110. The video content may include video and/or audio signals associated with a video asset (e.g., such as a movie, a video game, a music video, etc.). In one example, the format may correspond to a Motion Picture Experts Group (MPEG-1) format, an MPEG 2 format, or some other format.

Content server 140 may, in another example, generate a DVD application that includes the DVD features. The DVD application may be based on a format and/or language that can be processed and/or executed by video client 110. In one example, the DVD application may be based on a scripting language (e.g., such as a lua scripting language and/or some other language). In another example, the DVD application may be based on a binary protocol, a machine language protocol, or some other protocol that can be executed by video client 110. Content provider 140 may transmit the formatted video content to VOD server 120 and may transmit the DVD application to application server 130.

Figure 2:
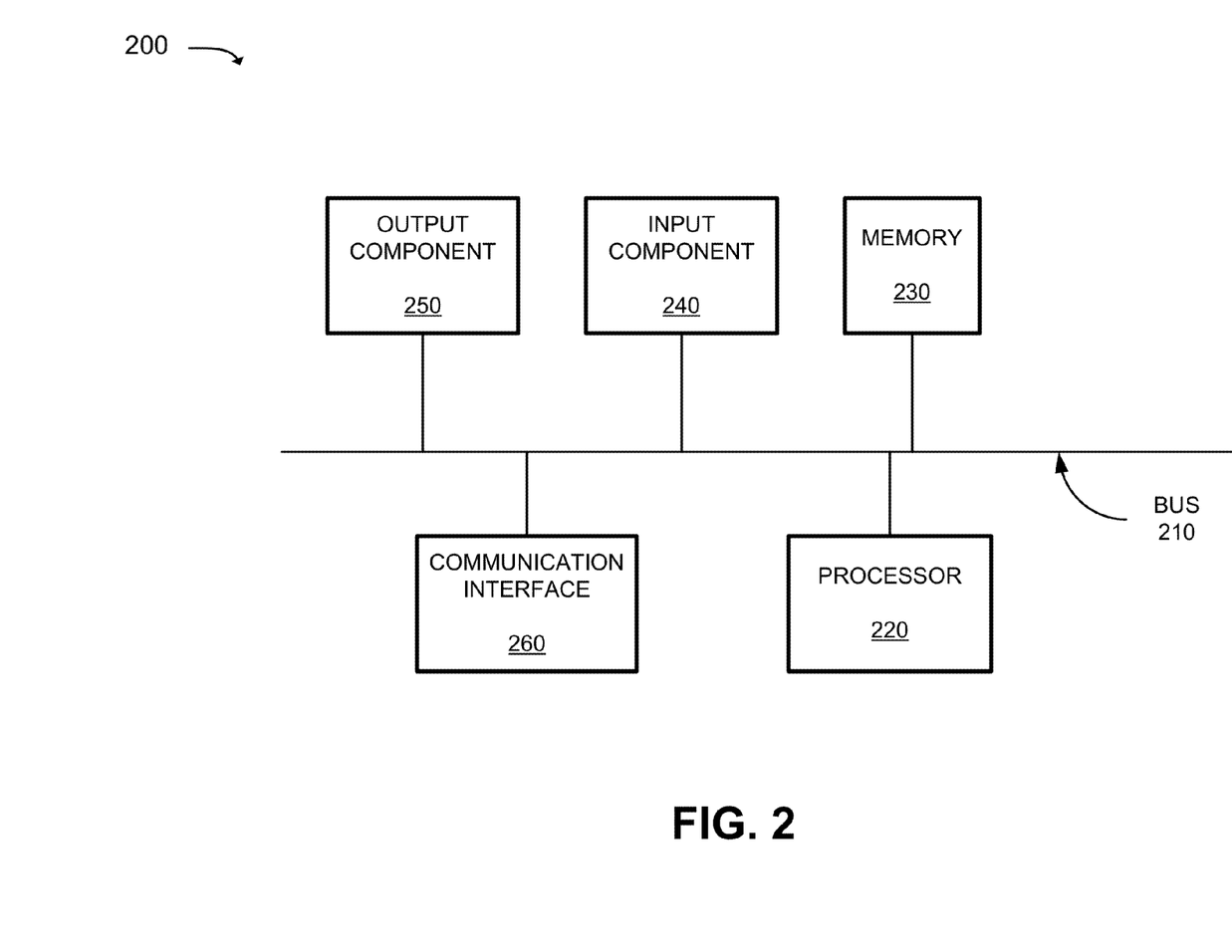
FIG. 2 is a diagram of example components of one or more of the devices depicted in FIG. 1.

FIG. 2 is a diagram of example components of a device 200 that may correspond to video client 110, VOD server 120, application server 130, and/or content server 140. Alternatively, each of video client 110, VOD server 120, application server 130, and/or content server 140 may include one or more devices 200. Device 200 may include a bus 210, a processor 220, a memory 230, an input component 240, an output component 250, and a communication interface 260. In another implementation, device 200 may include additional components, fewer components, different components, or differently arranged components than are shown in FIG. 2.

Bus 210 may include a path that permits communication among the components of device 200. Processor 220 may include a processor, microprocessor, or processing logic that may interpret and execute instructions. Memory 230 may include any type of dynamic storage device that may store information and instructions for execution by processor 220, and/or any type of non-volatile storage device that may store information for use by processor 220.

Input component 240 may include a mechanism that permits a user to input information to device 200, such as a keyboard, a keypad, a button, a switch, etc. Output component 250 may include a mechanism that outputs information to the user, such as a display, a speaker, one or more light emitting diodes (LEDs), etc. Communication interface 260 may include any transceiver-like mechanism that enables device 200 to communicate with other devices and/or systems. For example, communication interface 260 may include an Ethernet interface, an optical interface, a coaxial interface, or the like.

As will be described in detail below, device 200 may perform certain operations relating to generating and/or streaming interactive video content. Device 200 may perform these operations in response to processor 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause to processor 220 to perform processes described herein. Alternatively, hardwired circuitry may be used in place of or in combination with software instructions to implement processes described herein. Thus, implementations described herein are not limited to any specific combination of hardware circuitry and software.

The software instructions may be read into memory 230 from another computer-readable medium or from another device via communication interface 260. The software instructions contained in memory 230 may cause processor 220 to perform processes that will be described later. Alternatively, hardwired circuitry may be used in place of or in combination with software instructions to implement processes described herein. Thus, implementations described herein are not limited to any specific combination of hardware circuitry and software.

Figure 3:
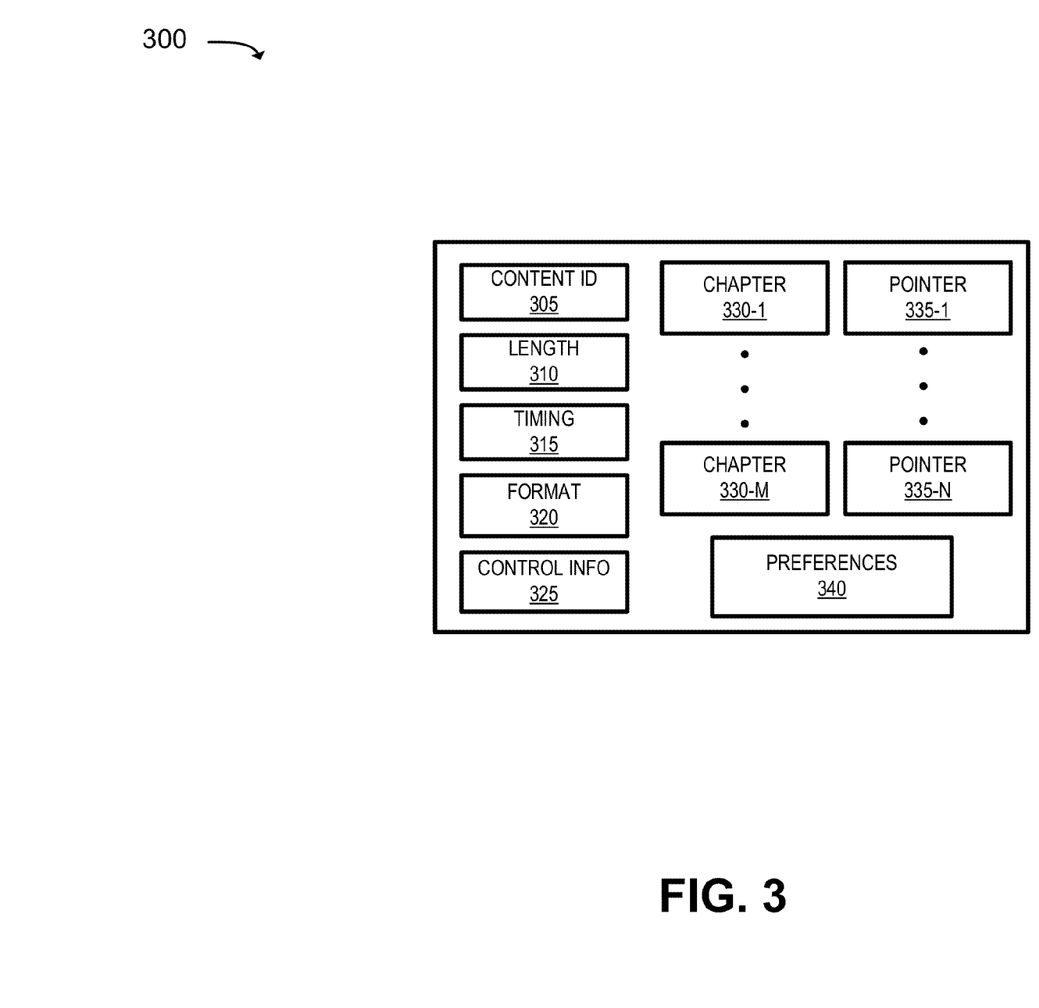
FIG. 3 is a diagram of an example DVD features data structure according to an implementation described herein.

FIG. 3 is a diagram of an example DVD features data structure 300 (hereinafter referred to as data structure 300) according to an implementation described herein. In one example implementation, all or a portion of the DVD features, stored in data structure 300, may be stored in packets (e.g., within a packet header, trailer, and/or payload) that are streamed, by VOD server 120, to video client 110. In another example implementation, all or a portion of the DVD features, stored in data structure 300, may be transmitted, by application server 130, to video client 110 as a portion of a DVD application. The DVD features, in this example, may be associated with video content being transmitted, from VOD server 120, to video client 110.

As illustrated in FIG. 3, data structure 300 may include a collection of fields, such as a content identifier (ID) field 305, a length field 310, a timing field 315, a format field 320, a control information field 325 (hereinafter referred to as "control field 325"), a group of chapter fields 330-1, . . . , 330-M (where M≥1) (hereinafter referred to collectively as "chapter fields 330" and individually as "chapter field 330"), a group of pointer fields 335-1, . . . , 335-N (where N≥1) (hereinafter referred to collectively as "pointer fields 330" and individually as "pointer field 335"), and a preferences field 340. FIG. 3 includes a number of fields for explanatory purposes. In practice, FIG. 3 may include additional fields, fewer fields, different fields, and/or differently arranged fields than are described with respect to data structure 300.

Content identifier (ID) field 305 may store an identifier associated with video content that is stored by VOD server 120. In another example, content ID field 305 may store an indicator (e.g., a control marker) that enables a client application, hosted by video client 110, to detect DVD features that are being streamed, from VOD server 120, to video client 110. Length field 310 may store information that identifies a quantity of bits, associated with DVD features, being received by video client 110. The quantity of bits may allow a client application, hosted by video client 110, to obtain the DVD features from the video stream. Timing field 315 may store information that enables the client application to synchronize operations with video content being received from VOD server 120. For example, timing field 315 may store information (hereinafter referred to as "timing information") that identifies when an operation is to be performed on video content. For example, the timing information may identify a point, associated with video content, when DVD features are to be presented, for display on video display 115, that is not associated with an instruction received from a user of video client 110.

Format field 320 may store information (hereinafter referred to as "format information") associated with a type of protocol and/or standard on which a DVD application is based. For example, format field 320 may store format information associated with a scripting language (e.g., such as a lua scripting language or some other scripting language) and/or a protocol (e.g., such as a binary protocol or some other protocol), which may cause the client application to communicate with the DVD application based on the protocol. The client application may communicate with the DVD application to cause the DVD application to execute. Causing the DVD application to execute may allow the DVD features to be generated by the DVD application.

Format field 320 may, in another example implementation, store format information that identifies a protocol and/or standard on which DVD features, received as a stream from VOD server 120, are based. In one example, format field 320 may store format information associated with an EBIF standard, which may cause the client application to process the DVD features, obtained from the stream, based on the EBIF standard.

Control field 325 may store information that identifies a type of operation to be performed using the DVD features obtained from the video stream and/or as a result of executing the DVD application received from application server 130. Control field 325 may store with instructions that correspond to a particular format identified in format field 320. In one example, control field 325 may store instructions that conform to the EBIF standard (e.g., an indication that that DVD features is available to be obtained from the stream). In another example, control field 325 may store other instructions, such as an indication that DVD features are to be displayed by video display 115, or temporarily stored by video client 110, erased from and/or over-written in a memory associated with video client 110, etc.

Control field 325 may store information associated with instructions, scripts, and/or applications that correspond to another particular format identified in format field 320. For example, control field 325 may store a script and/or application (e.g., in the form of an executable file, and/or some other form) that, when executed by the client application, enables video client 110 to perform a variety operations to provide DVD features associated with video content to be obtained from VOD server 120. The script and/or application may be based on a script language (e.g., such as lua script language, a binary protocol, etc.). In an example implementation, the script and/or application may correspond to an executable file (e.g., with a .lua file name extension, a binary file name extension, etc.) and other DVD features (e.g., specified by fields 305-320 and/or fields 330-340) may be included in one or more data files that are read and/or accessed by the application and/or script file. The variety of operations may, for example, be associated with displaying information and/or data, via an interactive multimedia user interface, such as menus, page templates (e.g., associated with borders, backgrounds, color schemes, sounds, etc.), images, video, animation, and/or other information (e.g., obtained from the DVD features and/or from application server 130 or some other device).

Chapter field 330 may store information that identifies a particular portion of video content. The portion of the video content may, for example, correspond to a scene, an episode, a trailer, etc. that is included within the video content and/or the interactive video content. A different chapter field 330 may be included, within data structure 300, for each scene, episode, trailer, etc. that is included in the video content and/or the interactive video content.

Pointer field 335 may store a value that corresponds to a point, relative to the video content, at which the particular portion of the video content starts. Pointer field 335 may also store another value that corresponds to another point, relative to the video content, at which the particular portion of the video content ends.

Preferences field 340 may store information that, when displayed by display device 115, allows a user, of video client 110, to specify preferences associated with the video content. For example, preferences field 340 may store information that allows the user to specify a language (e.g., English, Spanish, French, etc.) that the video content is to be played. In another example, preferences field 340 may store information that allows the user to specify whether closed captioning is to be enabled or disabled. In yet another example, preferences field 340 may store information that allows the user to specify audio or video preferences such as a resolution level (e.g., standard definition, high definition, etc.), sound quality, a screen size (e.g., an aspect ratio, etc.), and/or other preferences.

Figure 4:
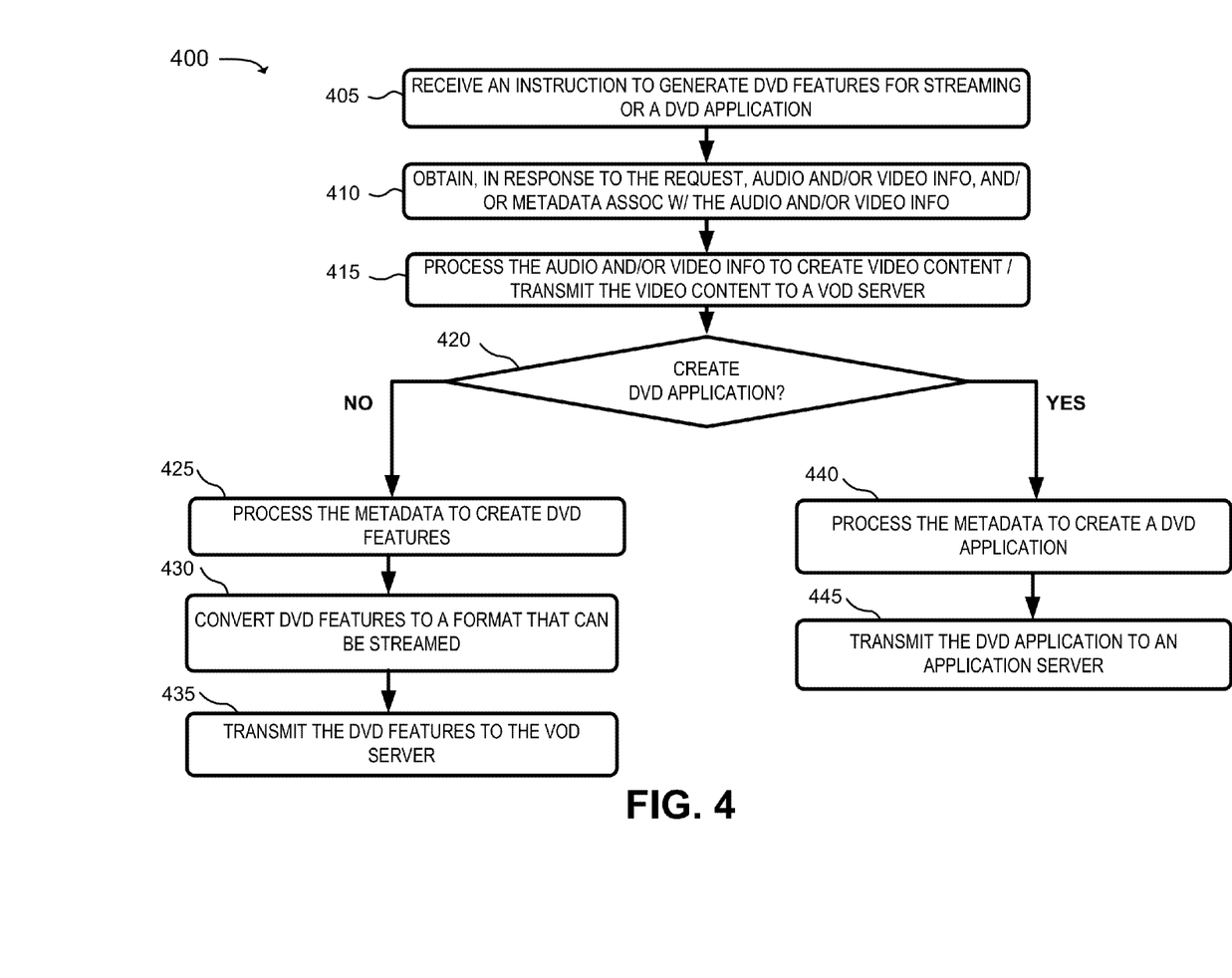
FIG. 4 is a flow chart of an example process for generating DVD features or a DVD application according to an implementation described herein.

FIG. 4 is a flow chart of an example process 400 for generating DVD features according to an implementation described herein. In one implementation, process 400 may be performed by content server 140. In another implementation, some or all of process 400 may be performed by a device or collection of devices separate from, or in combination with, content server 140.

As shown in FIG. 4, process 400 may include receiving an instruction to generate DVD features for streaming or a DVD application (block 405) and obtaining, in response to the instruction, audio and/or video information, and/or metadata associated with the audio and/or video information (block 410). For example, content server 140 may receive an instruction to generate video content using audio or video information (e.g., data, signals, etc.) that are stored in a memory and/or a storage device (e.g., a DVD, a hard drive, etc.). One or more different versions of the audio and/or video information may be stored within the memory and/or storage device, such as versions in different languages, at different levels of resolution (e.g., high definition, standard definition, etc.) etc.

The audio and/or video information may be stored on a DVD (e.g., in a DVD video format) that includes metadata associated with the audio and/or video information. The metadata may enable the audio and/or video information to be played, by a device (e.g., a DVD player, a computer device, etc.), in a manner that includes DVD features. The DVD features may permit a user, of the device, to interact with the audio and/or video information (e.g., to select a particular scene to view, to set preferences, etc.). Content server 140 may obtain, from the memory and/or storage device and in response to the instruction, the audio and/or video information, and/or the metadata.

As also shown in FIG. 4, process 400 may include processing the audio and/or video information to create video content and/or transmit the video content to a VOD server (block 415). For example, content server 140 may convert the audio and/or video information to a format that can be transmitted, from VOD server 120, to video client 110 and/or that is supported by video client 110. The format, that is supported by video client 110, may allow video client 110 to receive, process, and/or play the audio and/or video information. For example, content server 140 may convert the audio and/or video content from a first format (e.g., the DVD video format), to a second format (e.g., MPEG, MPEG-2, etc.) to create video content. The video content, associated with the second format, may enable the video content to be transmitted, via a video stream, from VOD server 120. Content server 140 may transmit the video content to VOD server 120 and VOD server 120 may store the video content.

As further shown in FIG. 4, if a DVD application is not to be created (block 420—NO), then process 400 may include processing the metadata to create DVD features (block 425). For example, content server 140 may perform an operation to generate DVD features that can be streamed by VOD server 120 based on the instruction that the DVD features are to be generated. Content server 140 may, as a result of the instruction, process the metadata to generate the DVD features that include all or a portion of the information stored in data structure 300 of FIG. 3.

For example, content server 140 may use the metadata to generate a unique identifier associated with the video content (e.g., an identifier, a title, etc.). Content server 140 may obtain, from the metadata, information associated with chapters that are associated with the video asset and/or information that identifies when each chapter starts and/or ends relative to the video content. Content server 140 may obtain, from the metadata, information that allows preferences, associated with the interactive video content, to be specified by a user of video client 110 (e.g., languages, closed captioning, resolution, screen size, etc.). Content server 140 may include, in the metadata, format information that indicates, to the client application hosted by video client 110, that the DVD features is to be processed in a manner that conforms to a particular standard (e.g., such an EBIF standard or some other standard).

Content server 140 may identify instructions, associated with the DVD features, to be executed by the client application when the DVD features are received and/or at a point, relative to the video content, that is specified by the instruction. The instructions may conform to the particular standard (e.g., the EBIF standard and/or some other standard) that is supported by video client 110. The instructions may include, for example, an instruction to obtain the DVD features (e.g., from the stream being received from VOD server 120), an instruction to display the DVD features, etc. Content server 140 may store the processed metadata in one or more data structures (e.g., data structure 300 of FIG. 3). For example, one data structure may correspond to DVD features that cause an interactive user interface to be displayed by video client 110 when DVD features, associated with the data structure, are received from VOD server 120. In another example, another data structure may be associated with DVD features that includes an instruction to perform an operation (e.g., to retrieve another portion of the video content, to display a caption, etc.).

As yet further shown in FIG. 4, process 400 may include converting DVD features to a format that can be streamed by a VOD server (block 430) and transmitting the DVD features to the VOD server (block 435). For example, content server 140 may convert the DVD features, stored in the data structures, to a format that can be streamed by VOD server 120 and/or that is supported by video client 110. For example, content server 140 may convert the DVD features from a first format (e.g., the DVD video format, a text format, a data format, etc.), to a second format (e.g., MPEG, MPEG-2, etc.). In another example, content server 140 may include a control marker at the beginning and/or end of a stream that includes the DVD features that allows video client 110 to detect when the DVD features have started to be received and/or has finished being received. Content server 140 may transmit the DVD features to VOD server 120.

Converting the DVD features to a format that can be streamed by VOD server 120 and/or supported by video client 110 may enable video client 110 to detect and/or receive the DVD features, and/or to present the DVD features for display, on video display 115, as an interactive user interface. The DVD features may include a collection of DVD elements and/or options displayed via the interactive user interface. The interactive user interface may allow a user, of video client 110, to select a DVD element and/or option, that corresponds to a chapter of video content that is stored within VOD server 120. Video client 110 may, based on the selection of the DVD element and/or option, send an instruction for VOD server 120 to begin streaming the video content at a location that corresponds to the chapter of video content.

As also shown in FIG. 4, if the DVD application is to be created (block 420—YES), then process 400 may include processing the metadata to create a DVD application (block 440). For example, content server 140 may process the metadata to create a DVD application and/or script based on an instruction to generate the DVD application. The DVD application may include an executable portion and a data portion. The DVD application may store other DVD features in the data portion.

Content server 140 may, in a manner similar to that described above with respect to block 425, use the metadata to generate the other DVD features. Content server 140 may, for example, generate a unique identifier associated with the video content (e.g., an identifier, a title, etc.) to be transmitted by VOD server 120. Content server 140 may obtain, from the metadata, information that corresponds to one or more chapters (e.g., scenes, trailers, segments, etc.) associated with the video content. Content server 140 may obtain, from the metadata, information that identifies when each chapter starts relative to the video content. Content server 140 may obtain, from the metadata, information that allows preferences, associated with the interactive video content, to be specified by a user of video client 110 (e.g., languages, closed captioning, resolution, screen size, etc.).

Content server 140 may also include format information with the other DVD features. The format information may identify a format that corresponds to DVD application. The format information may, for example, identify a script language, a protocol, and/or a standard on which the DVD application is based. The format information may allow the client application to process and/or execute the DVD application based on the script language, protocol, and/or standard. Content server 140 may include timing information with the other DVD features. The timing information may specify when particular operations, to be performed by the DVD application, are to be executed.

The DVD application may store the other DVD features and/or other information associated with the video content in the data portion of the DVD application. The data portion may include a variety of data formats and/or data types that can be read by the executable portion of the DVD application. The data portion may, for example, include one or more data files (e.g., associated with the variety data formats and/or data types associated with text, image, video, audio, etc.). Content server 140 may associate the other DVD features with the data portion and/or may store the other DVD features in the one or more data files.

The executable portion my include software code that is based on a scripting language (e.g., based on a lua script language, a binary protocol, etc.) that executes instructions using the other DVD features obtained from the data portion and/or read from the one or more data files. The instructions may enable video client 110 to present the other DVD features for display, on video display 115, as an interactive user interface. The interactive user interface may allow a user, of video client 110, to select a DVD element and/or option that corresponds to a chapter of video content that is store within VOD server 120. Video client 110 may, based on the selection of the DVD element and/or option, send an instruction for VOD server 120 to begin streaming the portion of the video content from a location that corresponds to the chapter of the video content.

As further shown in FIG. 4, process 400 may include transmitting the DVD application to an application server (block 445). For example, content server 140 may transmit the DVD application (e.g., the executable portion and/or the data portion) to application server 130 to be stored and/or transmitted to video client 110 in response to the request for the video content.

Figure 5:
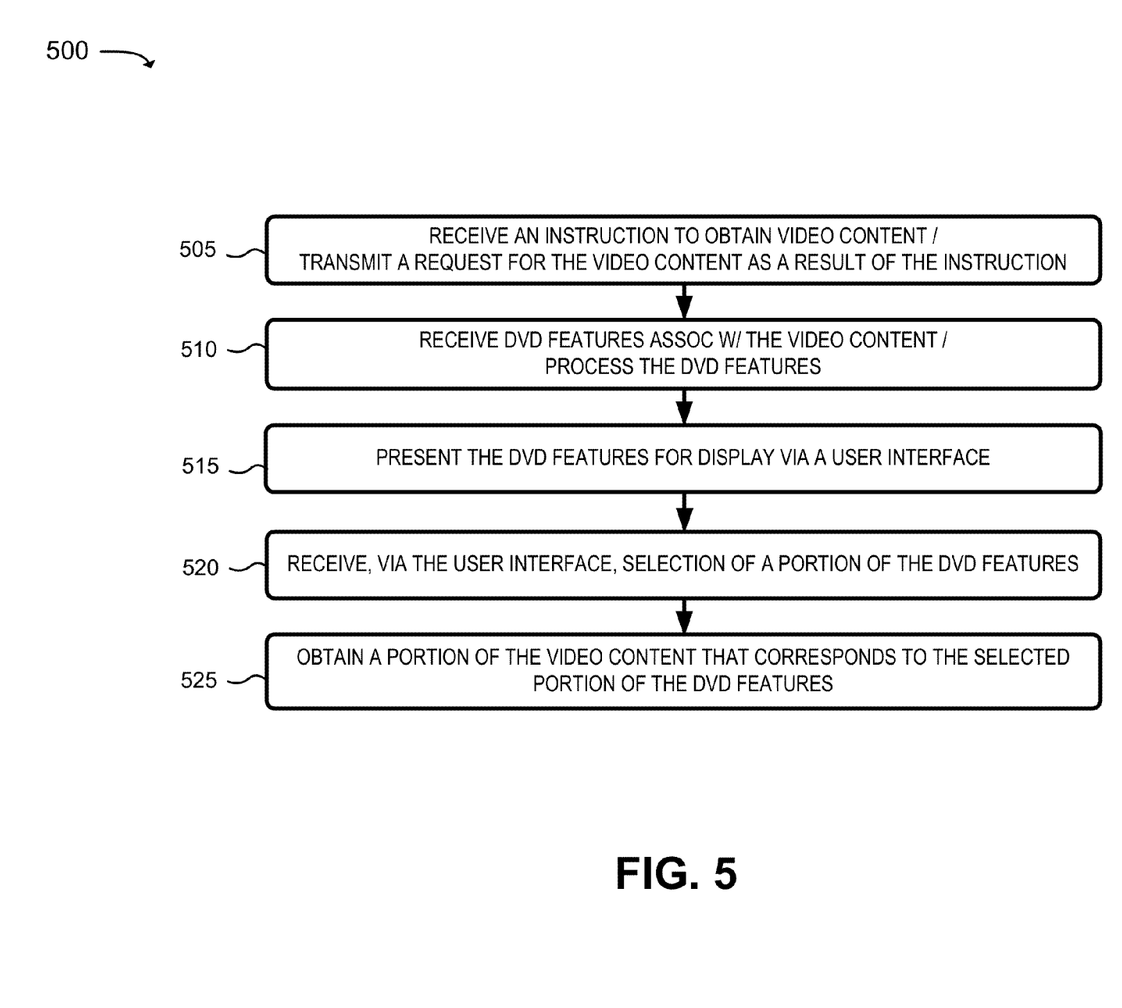
FIG. 5 is a flow chart of an example process for playing and/or interacting with video content, using DVD features, according to an implementation described herein.

FIG. 5 is a flow chart of an example process 500 for playing and/or interacting with video content, using DVD features, according to an implementation described herein. In one implementation, process 500 may be performed by video client 110. In another implementation, some or all of process 500 may be performed by a device or collection of devices separate from, or in combination with, client device 110.

As shown in FIG. 5, process 500 may include receiving an instruction to obtain video content and/or transmitting a request for the video content as a result of the instruction (block 505). For example, a user, of video client 110, may select metadata, associated with video content, that is included in an IMG displayed on video display 115. Video client 110 may receive, as an instruction to obtain the video content, the selection of the metadata. Video client 110 may transmit a request to application server 130 for the video content as a result of the instruction. Application server 130 may receive the request and may instruct VOD server 120 to transmit DVD features, associated with the video content, to video client 110. VOD server 120 may receive the instruction from application server 130 and may transmit the DVD features to client device 110 as a video stream. In another example implementation, video client 110 may transmit the request directly to VOD server 120 to obtain the DVD features.

As also shown in FIG. 5, process 500 may include receiving the DVD features associated with the video content and/or processing the DVD features (block 510). For example, video client 110 may receive a stream, that includes DVD features, from VOD server 120 and a client application, hosted by video client 110, may detect the DVD features included within the stream. In one example, the client application may detect a control marker (e.g., associated with content ID 305 of FIG. 3) that identifies the stream as the DVD features associated with video client 110. Video client 110 may decode the DVD features (e.g., based on a CODEC application hosted by video client 110). The client application may detect a protocol and/or standard on which the DVD features are based. The client application may use the information associated with the protocol and/or standard to interpret control instructions that are included within the DVD features. In one example, the client application may determine that the DVD features are based on an EBIF standard and/or some other standard.

The client application may, based on the protocol and/or standard on which the DVD features are based, detect an instruction (e.g., an EBIF instruction) to process and/or store the DVD features. For example, the client application may determine that the DVD features include another instruction that the DVD features are to be presented, for display, on video display 115.

As further shown in FIG. 5, process 500 may include presenting, for display, the DVD features via a user interface (block 515). For example, based on the determination that the other instruction indicates that the DVD features are to be displayed, the client application may present the DVD features for display, on video display 115, as an interactive user interface. The interactive user interface may include the DVD features, such as one or more DVD elements and/or options (e.g., chapter identifiers) that correspond to one or more chapters of the video content (e.g., that correspond to different scenes, trailers, games, etc.). The interactive user interface may also include other DVD features such as DVD elements and/or options that correspond to preference settings (e.g., languages, video quality, screen size, closed captioning, etc.) that can be specified by a user of video client 110.

As yet further shown in FIG. 5, process 500 may include receiving, via the user interface, selection of a portion of the DVD features (block 520) and obtaining a portion of the video content that corresponds to the selected portion of the DVD features (block 525). For example, the user, of video client 110, may select, via the interactive user interface, a portion of the DVD features. The selected portion of the DVD features may, in one example, include an identifier that corresponds to a particular DVD element and/or option associated with one or more chapters of the video content. In another example, the selected portion of the DVD features may include a DVD element and/or option that corresponds to a preference setting (e.g., a language, video quality, screen size, closed captioning, etc.) associated with the video content. Video client 110 may receive the selection of the portion of the DVD features and may transmit, to VOD server 120, a request for a portion of the video content (e.g., the one or more chapters, preferences, etc.) that corresponds to the selected portion of the DVD features. VOD server 120 may receive the request and may begin streaming the portion of the video content that corresponds to the selected portion of the DVD features. Video client 110 may receive the portion of the video content and may display the portion of the video content on display device 115.

In another example, the user may select an option (e.g., such as a play button), via the user interface, that causes the video content to be started from a beginning point. Video client 110 may, for example, receive the selected option and may obtain, from VOD server 120, the video content from a point that corresponds to the beginning of the video content.

Figure 6:
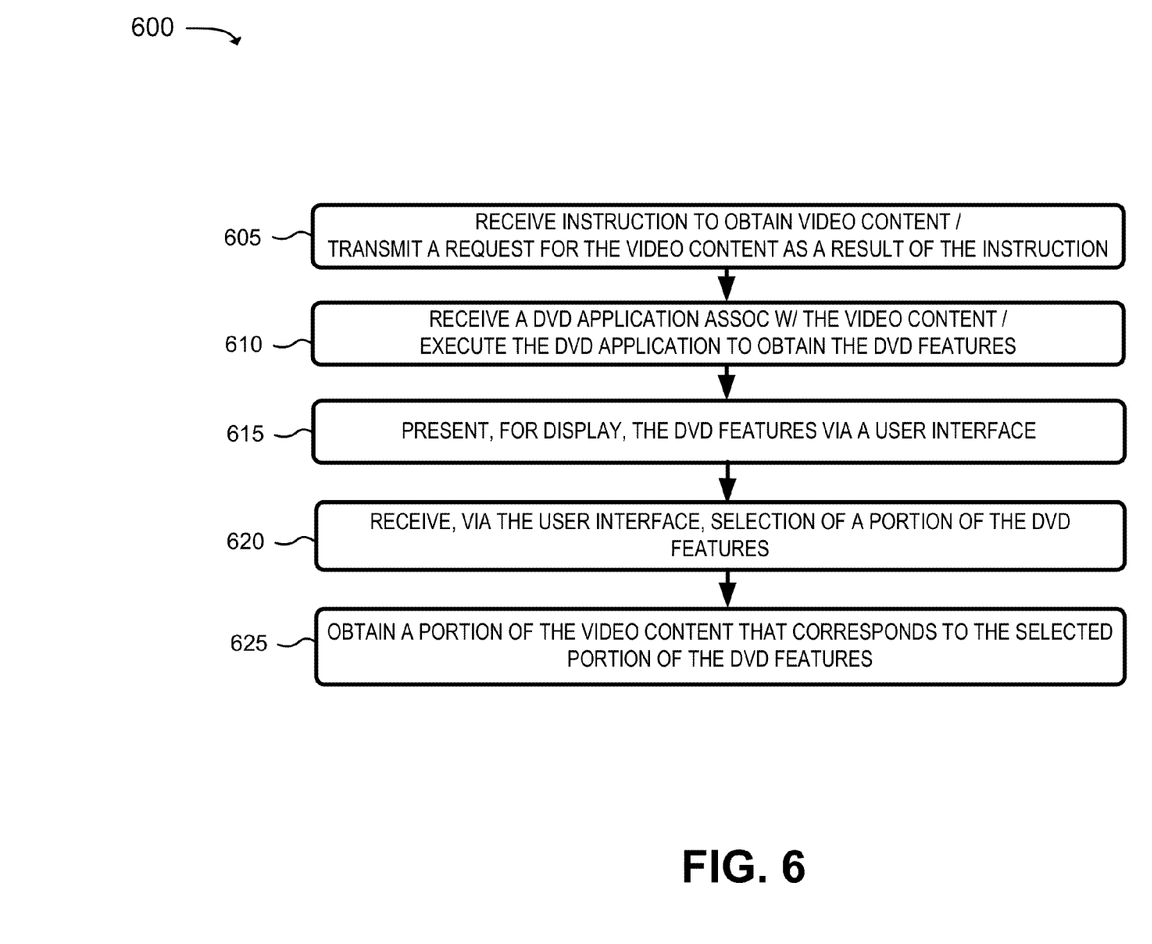
FIG. 6 is a flow chart of an example process for playing and/or interacting with video content, using a DVD application, according to an implementation described herein.

FIG. 6 is a flow chart of an example process 600 for playing and/or interacting with video content, using a DVD application, according to an implementation described herein. In one implementation, process 600 may be performed by video client 110. In another implementation, some or all of process 600 may be performed by a device or collection of devices separate from, or in combination with, client device 110.

As shown in FIG. 6, process 600 may include receiving an instruction to obtain video content and/or transmitting a request for the video content as a result of the instruction (block 605). For example, a user, of video client 110, may select metadata, associated with video content, that is included in an IMG displayed on video display 115. Video client 110 may receive, as an instruction to obtain the video content, the selection of the metadata. Video client 110 may transmit a request to application server 130 for the video content as a result of the instruction. Application server 130 may receive the request and may retrieve, from a memory associated with application server 130, a DVD application associated with the video content. Application server 130 may transmit the DVD application, to video client 110, in response to the request.

As also shown in FIG. 6, process 600 may include receiving a DVD application, associated with the video content and/or executing the DVD application to obtain DVD features (block 610). For example, video client 110 may receive the DVD application from application server 130. Video client 110 may use a client application to process and/or execute the DVD application.

The client application may, for example, perform an operation on the DVD application, such as decompressing and/or decoding the DVD application. The decompressed and/or decoded DVD application may permit client application to obtain an executable portion and/or a data portion of the DVD application. For example, the executable portion may include an application and/or script (e.g., based on a lua script language, a binary protocol, etc.) that executes instructions using DVD features obtained from the data portion and/or read from the one or more data files. The instructions may cause the DVD application to present, for display, the DVD features that allows a user, of video client 110, to interact with the DVD features. The data portion may, for example, include one or more data files (e.g., associated with a variety formats associated with text, image, video, audio, etc.). The data portion may include the DVD features associated with the video content.

In another example, decompressing and/or decoding the application may enable the client application to install (e.g., on video client 110) and/or execute the DVD application. For example, the client application may store the DVD application in a memory associated with video client 110. In another example, the client application may cause the executable portion of the DVD application to execute, which may allow the DVD application to obtain the DVD features associated with the video content. The executable portion may, in response to an instruction, begin to execute (e.g., based on the lau script, or another script based on a binary protocol or some other protocol).

The executable portion may, for example, perform an operation on data files, associated with the data portion, such as decompressing the data files, converting the data files to a format that can be understood by video client 110 and/or a user of video client 110, etc. The executable portion may obtain, from the processed data files, the DVD features. The DVD application may instruct video client 110 to render the DVD features for display on video display 115.

In another example implementation, the data portion, of the DVD application, may be stored by application server 130 and the DVD application (e.g., the executable portion) may communicate with application server 130 to retrieve the DVD features. In yet another example implementation the DVD application may retrieve DVD features and/or other information (e.g., such as metadata) associated with the video content (e.g., images, trailers, descriptions, ratings, etc.) from application server 130 and/or another device (e.g., a web server via the Internet).

As further shown in FIG. 6, process 600 may include presenting, for display, the DVD features via a user interface (block 615). For example, the DVD application may instruction video client 110 to present the DVD features for display, on video display 115, as an interactive user interface. The interactive user interface may, in a manner similar to that described above with respect to block 515 of FIG. 5, include the DVD features, such as one or more DVD elements and/or options (e.g., such as chapter identifiers) that correspond to one or more chapters of the video content (e.g., that correspond to different scenes, trailers, games, etc.). The interactive user interface may also include other DVD features such as DVD elements and/or options associated with preference settings (e.g., languages, video quality, screen size, closed captioning, etc.) that can be specified by a user of video client 110.

As yet further shown in FIG. 6, process 600 may include receiving, via the user interface, selection of a portion of the DVD features (block 620) and obtaining a portion of the video content that corresponds to the selected portion of the DVD features (block 625). For example, the user, of video client 110, may select, via the interactive user interface, a DVD element and/or option. The selected DVD element and/or option may, in one example, correspond to a particular chapter associated with the video content. In another example, the selected DVD element may correspond to a preference setting (e.g., a language, video quality, screen size, closed captioning, etc.) associated with the video content. Video client 110 may receive the selection of the DVD element and/or option and may transmit, to VOD server 120, a request for a portion of the video content that corresponds to the selected DVD element and/or option. VOD server 120 may receive the request and may begin streaming the portion of the video content that corresponds to the selected DVD element and/or option. Video client 110 may receive the portion of the video content and may display the portion of the video content on display device 115.

In another example, the user may select a DVD element and/or option (e.g., such as a play button), via the user interface, that causes the video content to be started from a beginning point. Video client 110 may, for example, receive the selected element and/or option and may obtain, from VOD server 120, the video content from a point that corresponds to the beginning of the video content.

Figure 7A:
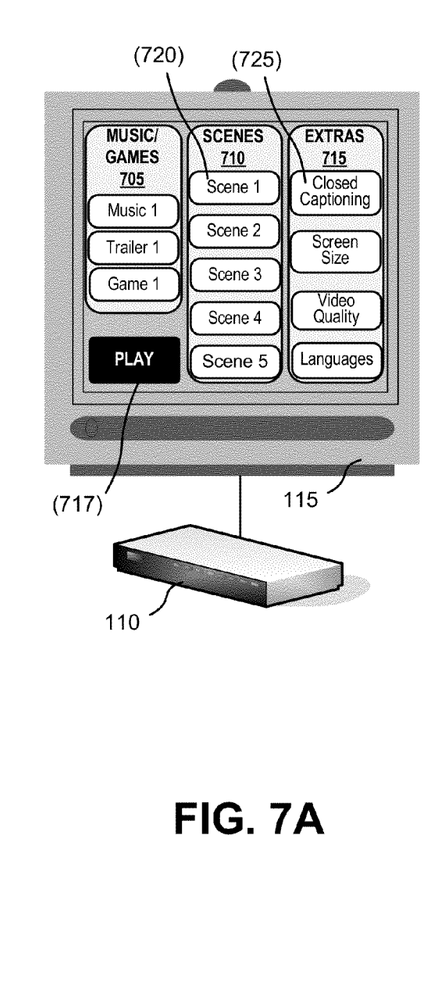
FIGS. 7A-7C are diagrams of example DVD features being displayed and used to obtain portions of video content, with which the DVD features are associated, according to an implementation described herein.
Figure 7B:
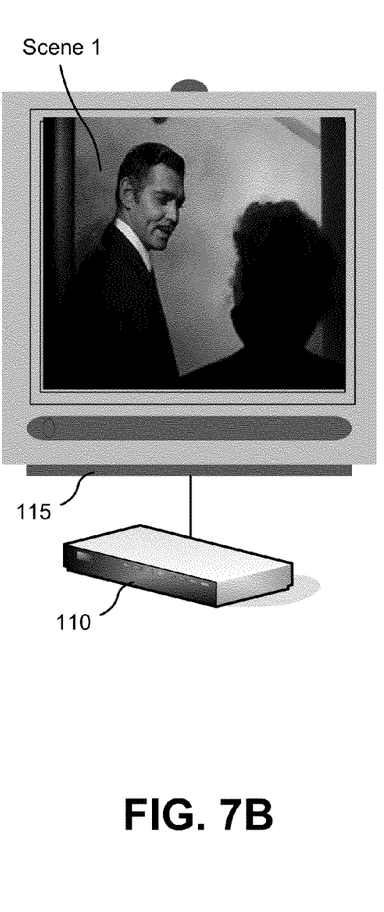
Figure 7C:
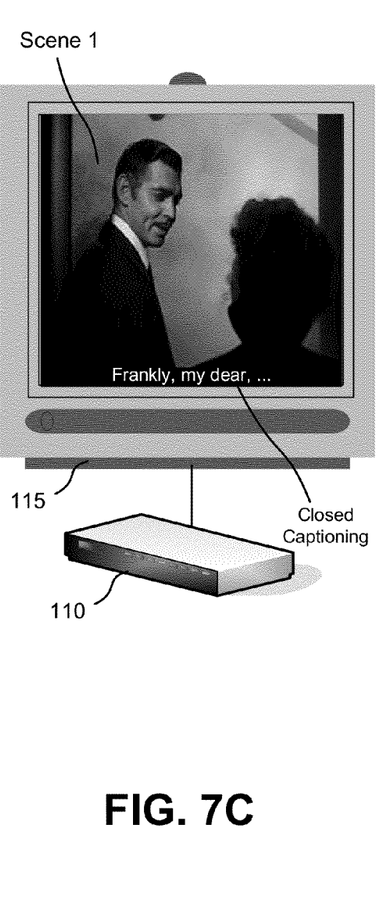

FIGS. 7A-7C are diagrams of example DVD features user interface 700 (hereinafter referred to as "DVD features 700") being displayed and used to obtain portions of video content, with which the DVD features are associated, according to an implementation described herein. As shown in FIG. 7A, DVD features 700 may be rendered, by video client 110, for display, on video display 115. DVD features 700 may include a collection of data items such as a music/games data item 705, a scenes data item 710, an extras data item 715, and a play button 717. DVD features 700 include a number of data items and/or buttons for explanatory purposes. In practice, DVD features 700 may include additional data items and/or buttons, fewer data items and/or buttons, different data items and/or buttons, and/or differently arranged data items and/or buttons than are described with respect to DVD features 700.

Music/games data item 705 may include one or more data items (e.g., shown as music 1, trailer 1, game 1, etc.) that correspond to portions of the video content associated with music, trailers, and/or games that, when selected by a user of video client 110, can be played by video client 110 and/or rendered for display on video display 115. Scenes data item 710 may include one or more data items (e.g., shown as scene 1, . . . , scene 5, etc.) that correspond to other portions of the video content associated with different scenes, chapters, etc. of the video content that, when selected by the user, can be rendered for display on video display 115. Extras data item 715 may include one or more data items (e.g., shown as closed captioning, video quality, screen size, languages, etc.) that correspond to further portions of the video content that may affect the manner in which the video content is rendered for display on video display 115. In another example implementation, the data items corresponding to music, trailers, and/or games data item 705 may be included in extras data item 715.

For example, the user may select one of the data items (e.g., scene 1 data item 720), associated with scenes data item 710, which may cause video client 110 to transmit a request, to VOD server 120, to obtain a portion of the video content that begins at the selected scene 1 data item 720. VOD server 120 may receive the request and may begin transmitting the portion of the video content to video client 110. As shown in FIG. 7B, video client 110 may receive the portion of the video content and may display the portion of the video content on video display 115 (e.g., labeled as scene 1 in FIG. 7B).

In another example, the user may desire to specify a preference setting associated with the video content. For example, the user may instruct video client 110 to render DVD features 700 for display on video display 115 (e.g., when the user presses a button or series of buttons on video client 110 and/or a remote control associated with video client 110). The user may select a data item (e.g., closed captioning data item 725), associated with extras data item 715, which may cause video client 110 to transmit a request, to VOD server 120, to obtain another portion of the video content that corresponds to the selected closed captioning data item 725. VOD server 120 may receive the request and may transmit the portion of the video content, that corresponds to the selected closed captioning data item 725, to video client 110. As shown in FIG. 7C, video client 110 may receive the other portion of the video content and may display the other portion of the video content (e.g., shown as "Frankly, my dear, . . . ") on video display 115 (e.g., labeled as closed captioning in FIG. 7C).

Systems and/or methods, described herein, may allow a VOD server to provide video content to a video client device in a manner that permits a user, of the video client device, to interact with the video content as though the user was playing the video content from a DVD player. The systems and/or methods may allow a content server obtain video content from a storage device (e.g., such as a DVD) and to create interactive video content by embedding DVD features within the video content. The systems and/or methods may allow the video client device to play the interactive video content, which may enable a user, of the video client device, to interact with the interactive video content as though the interactive video content was being played by a DVD player.

The systems and/or methods may cause the DVD features to be used to generate a DVD application (e.g., based on a script language based on lua or a binary protocol) associated with video content obtained from the storage device. The video client device may execute the DVD application to allow the user to interact with video content, obtained from the VOD server, as though the video content was being played from a DVD.

The foregoing description provides illustration and description, but is not intended to be exhaustive or to limit the implementations to the precise form disclosed. Modifications and variations are possible in light of the above teachings or may be acquired from practice of the implementations.

While series of blocks have been described with regard to FIGS. 4-6, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Further, certain portions, described above, may be implemented as a component or logic that performs one or more functions. A component or logic, as used herein, may include hardware, such as a processor, an application-specific integrated circuit (ASIC), or a field-programmable gate array (FPGA), or a combination of hardware and software (e.g., a processor executing software).

It should be emphasized that the term "comprises/comprising," when used in this specification, is taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, performed by a video client device, the method comprising:
sending a request for video content to a server device;
receiving, in response to the request, a video stream including digital video disc (DVD) features that correspond to one or more portions of the video content;
detecting the DVD features within the video stream;
receiving, in response to the request, a control application associated with the video content, which, when executed by the video client device, renders the DVD features;
decoding, based on a codec application hosted on the video client device, the control application and the DVD features within the video stream;
identifying, after the decoding, an Enhanced Television (ETV) binary interchange format (EBIF) standard associated with the DVD features;
determining that the DVD features include an instruction to present the DVD features for display,
presenting the DVD features for display, on a display device associated with the video client device, where presenting the DVD features for display enables a user, of the video client device, to interact with the DVD features as though the video content was being played by a DVD player;
receiving selection of a DVD feature, of the DVD features; and
obtaining, from the server device, a portion of the video content, of the one or more portions of the video content, that begins at a point that corresponds to the selected DVD feature.

2. The method of claim 1, wherein detecting the DVD features within the video stream further includes:

detecting a marker in the video stream that identifies that the DVD features being included within the video stream; and obtaining, from the video stream, the DVD features as a result of detecting the marker in the video stream.

3. The method of claim 1, further comprising:
transmitting, to another server device and in response to the request, another request for the DVD features associated with the video content; and
receiving, from the other server device and as a result of the other request, the DVD features.

4. The method of claim 1, where the video client device is a set-top box.

5. The method of claim 1, further comprising:
executing the first portion of the control application to cause the first portion of the application to:
retrieve the one or more DVD features, and
instruct the video client to present the DVD features for display on the display device.

6. The method of claim 1, where the server device is a video on-demand (VOD) server device that streams on-demand video content to video client devices.

7. The method of claim 1, where presenting the DVD features for display further includes:
presenting, via a user interface, the one or more DVD features, where the user interface enables the user to select from among:
a first group of the DVD features that corresponds to one or more scenes associated with the video content,
a second group of the DVD features that corresponds to different languages or closed captioning associated with the video content, and
a third group of the DVD features that corresponds to video quality or screen size associated with the video content.

8. A video client device, comprising:
one or more processors to:
receive a request for video content,
receive, from a server device and in response to the request, a video stream including digital versatile disc (DVD) features, associated with the video content,
detect the DVD features within the video stream,
receive, from the server device and in response to the request, a control application associated with the video content,
decode, based on a codec application hosted on the video client, the control application and the DVD features,
install the control application, where the control application includes a portion based on a Lua scripting language that can be executed to present the DVD features,
determine that the DVD features include an instruction to present the DVD features for display, and wherein the DVD features include:
a first group of the DVD features that corresponds to one or more scenes associated with the video content,
a second group of the DVD features that corresponds to different languages or closed captioning associated with the video content, and
a third group of the DVD features that corresponds to video quality or screen size associated with the video content;
present, on a display device, options from the DVD features,
receive selection of one of the options from the DVD features, and obtain, from the server device, a portion of the video content, that corresponds to the selected one of the options from the DVD features.

9. The video client device of claim 8, where the DVD features, presented on the display device, permit a user, of the video client device, to interact with the DVD features as though the video content was being played by a DVD player.

10. The video client device of claim 8, where, when receiving selection of the one of the options included in the DVD features, the one or more processors are further to:
cause the one or more preferences to be set with respect to the portion of the video content, where the preferences include at least one of:
a level of video quality associated with the portion of the video content,
a language associated with the portion of the video content, or
closed captioning associated with the portion of the video content.

11. The video client device of claim 8, where, detecting the DVD features within the video stream, the one or more processors are further to:
detect a marker in the video stream that identifies that the DVD features being included within the video stream; and
obtain, from the video stream, the DVD features as a result of detecting the marker in the video stream.

12. The video client device of claim 8, where the video client device is a set-top box.

13. The video client device of claim 8, where the one or more processors are further to:
transmit, to another server device and in response to the request, another request for the DVD features associated with the video content; and
receive, from the other server device and as a result of the other request, the DVD features.

14. A system, comprising:
a first server device including one or more processors to:
read metadata, associated with video content from a digital versatile disc (DVD), where the metadata includes information that specifies a manner in which the video content is stored in the storage device,
create, based on the metadata, DVD features associated with the video content, where the DVD features include a list of scenes at which the video content can be played, and where the DVD features conform to an enhanced television (ETV) binary interchange format (EBIF) standard, and
convert the DVD features into a format that can be streamed to a user device; and
a second server device including one or more processors to:
receive, from a user device, a request for the video content,
retrieve the video content and the DVD features associated with the video content,
transmit, to the user device and in response to the request, the DVD features associated with the video content and a control application that allows the user device to execute the control application to render the DVD features, wherein the DVD features include:
a first group of the DVD features that corresponds to one or more scenes associated with the video content,
a second group of the DVD features that corresponds to different languages or closed captioning associated with the video content, and a third group of the DVD features that corresponds to video quality or screen size associated with the video content, and where the control application is based on a scripting language associated with a Lua scripting language or a binary protocol, receive information, from the user device, identifying one scene in the list of scenes, and begin to transmit, in response to the received information, the video content to the user device at a point that corresponds to the one scene.

15. The system of claim 14, where the one or more processors of the first server are further to:

obtain, from the storage device, audio and video data associated with the video content.

16. The system of claim 14, where, the DVD features conform to an enhanced television (ETV) binary interchange format (EBIF) standard, and where, when transmitting the DVD features, the one or more processors of the second server device are to:

stream the DVD features, to the user device, based on the DVD features conforming to the EBIF standard.

17. The system of claim 14, where, when transmitting the DVD features associated with the video content, the one or more processors of the second server device are to:

insert the DVD features into a video stream directed to the user device, and insert a marker into the video stream that identifies that the DVD features are included within the video stream.

\* \* \* \* \*